United States Patent
Niino

(10) Patent No.: US 12,389,479 B2
(45) Date of Patent: Aug. 12, 2025

(54) COMMUNICATION DEVICE, COMMUNICATION METHOD, AND PROGRAM

(71) Applicant: NEC Corporation, Tokyo (JP)

(72) Inventor: Ryuta Niino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 18/082,846

(22) Filed: Dec. 16, 2022

(65) Prior Publication Data

US 2023/0209628 A1     Jun. 29, 2023

(30) Foreign Application Priority Data

Dec. 24, 2021    (JP) .................................. 2021-210853

(51) Int. Cl.
    *H04W 24/10*     (2009.01)
    *H04W 76/15*     (2018.01)

(52) U.S. Cl.
    CPC ........... *H04W 76/15* (2018.02); *H04W 24/10* (2013.01)

(58) Field of Classification Search
    CPC ...... H04W 76/15; H04W 24/10; H04L 1/004; H04L 1/0007
    See application file for complete search history.

(56) References Cited

U.S. PATENT DOCUMENTS

| | | |
|---|---|---|
| 2007/0177531 A1 | 8/2007 | Rue |
| 2010/0202309 A1 | 8/2010 | Suneya |
| 2013/0259226 A1* | 10/2013 | Ciet .......................... H04L 9/08 380/44 |
| 2021/0303425 A1* | 9/2021 | Pozidis ............... H03M 13/154 |

FOREIGN PATENT DOCUMENTS

| | | |
|---|---|---|
| CN | 103684695 B | 11/2016 |
| EP | 1562317 A2 | 8/2005 |
| EP | 4037269 A1 | 8/2022 |
| JP | 2007-325320 A | 12/2007 |
| JP | 2010-183439 A | 8/2010 |

(Continued)

OTHER PUBLICATIONS

Extended European Search Report for EP Application No. 22214619.3, dated on May 4, 2023.

(Continued)

*Primary Examiner* — Chuong A Ngo
(74) *Attorney, Agent, or Firm* — Sughrue Mion, PLLC

(57) ABSTRACT

A communication device calculates a setting value of a split number of transmission data, based on a transmission parameter between the communication device and a transmission destination communication device to which the transmission data is to be transmitted. The communication device splits the transmission data based on the setting value of the split number to obtain a plurality of pieces of split data. The communication device generates a plurality of transmission units and transmits the plurality of transmission units to the transmission destination communication device. The plurality of transmission units includes: a transmission unit that includes one of the plurality of transmission units; and a transmission unit composed of an exclusive OR of a plurality of pieces of split data that are selected randomly from the plurality of pieces of split data.

6 Claims, 9 Drawing Sheets

(56) References Cited

FOREIGN PATENT DOCUMENTS

| | | |
|---|---|---|
| JP | 2013-225761 A | 10/2013 |
| JP | 2014-078065 A | 5/2014 |
| JP | 2021-052353 A | 4/2021 |
| WO | 2014/132446 A1 | 9/2014 |
| WO | 2021/060406 A1 | 4/2021 |

OTHER PUBLICATIONS

JP Office Action for JP Application No. 2021-210853, mailed on Jun. 24, 2025 with English Translation.

* cited by examiner

INPUT BUFFER CONSUMPTION RATE

| | K VALUE | <20% | 20~70% | >70% |
|---|---|---|---|---|
| RSSI VALUE | -40 OR MORE | 5 | 5 | 3 |
| | -40 TO -55 | 5 | 5 | 5 |
| | LESS THAN -55 | 7 | 7 | 7 |

COMMUNICATION DEVICE, COMMUNICATION METHOD, AND PROGRAM

This application is based upon and claims the benefit of priority from Japanese patent application No. 2021-210853, filed on Dec. 24, 2021, the disclosure of which is incorporated herein in its entirety by reference.

TECHNICAL FIELD

The present disclosure relates to a communication device, a communication method, and a program.

BACKGROUND ART

There is a technique for preventing a reduction in the amount of communication per unit time even when the state of wireless communication is bad. For example, in this technique, in order to prevent a reduction in the amount of communication per unit time, packet encoding, transmission data splitting for transmitting, communication frequency switching, and so forth are performed.

International Publication No. WO 2021/060406 discloses a technique of transmitting encoded packets on the basis of a transmission rate calculated based on a packet loss rate.

Japanese Unexamined Patent Application, First Publication No. 2014-78065 discloses a technique of increasing or decreasing the speed of data communication on the basis of a buffer usage rate.

SUMMARY

In wireless techniques such as those mentioned above, there is a demand for a technique of performing communication with a more appropriate amount of data per unit time, according to the state of wireless communication.

An example object of the present disclosure is to provide a communication device, a communication method, and a program for solving the problem mentioned above.

According to a first example aspect of the present disclosure, a communication device includes: a memory configured to store instructions; and a processor configured to execute the instructions to: calculate a setting value of a split number of transmission data, based on a transmission parameter between the communication device and a transmission destination communication device to which the transmission data is to be transmitted; split the transmission data based on the setting value of the split number to obtain a plurality of pieces of split data; generating a plurality of transmission units, the plurality of transmission units including: a transmission unit that includes one of the plurality of transmission units; and a transmission unit composed of an exclusive OR of a plurality of pieces of split data that are selected randomly from the plurality of pieces of split data; and transmitting the plurality of transmission units to the transmission destination communication device.

According to a second example aspect of the present disclosure, a communication method for a communication device includes: calculating a setting value of a split number of transmission data, based on a transmission parameter between the communication device and a transmission destination communication device to which the transmission data is to be transmitted; splitting the transmission data based on the setting value of the split number to obtain a plurality of pieces of split data; generating a plurality of transmission units, the plurality of transmission units including: a transmission unit that includes one of the plurality of transmission units; and a transmission unit composed of an exclusive OR of a plurality of pieces of split data that are selected randomly from the plurality of pieces of split data; and transmitting the plurality of transmission units to the transmission destination communication device.

According to a third example aspect of the present disclosure, a non-transitory computer-readable recording medium stores a program for causing a computer of a communication device to execute: calculating a setting value of a split number of transmission data, based on a transmission parameter between the communication device and a transmission destination communication device to which the transmission data is to be transmitted; splitting the transmission data based on the setting value of the split number to obtain a plurality of pieces of split data; generating a plurality of transmission units, the plurality of transmission units including: a transmission unit that includes one of the plurality of transmission units; and a transmission unit composed of an exclusive OR of a plurality of pieces of split data that are selected randomly from the plurality of pieces of split data; and transmitting the plurality of transmission units to the transmission destination communication device.

EXAMPLE EMBODIMENT

Figure 1:
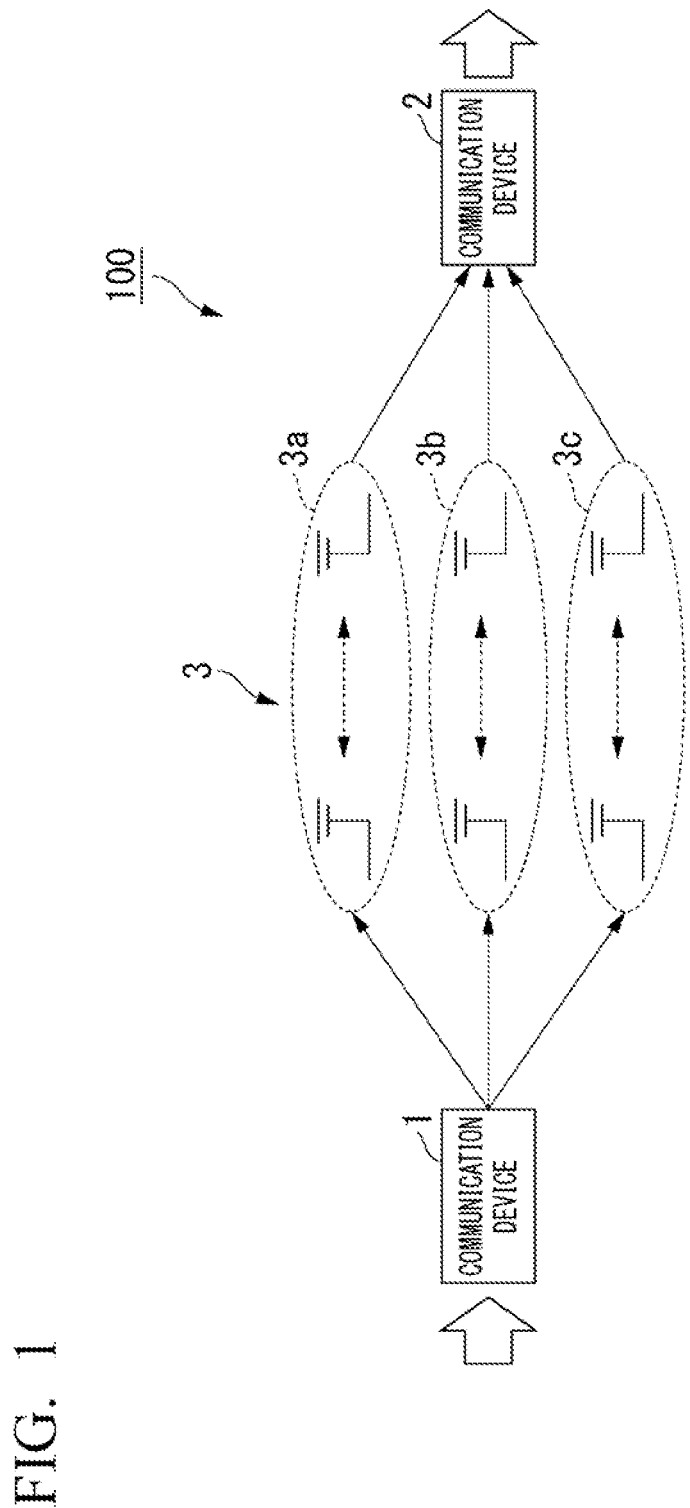
FIG. 1 is a diagram showing a configuration of a wireless communication system according to the present example embodiment.

FIG. 1 is a diagram showing a configuration of a wireless communication system according to the present example embodiment.

A wireless communication system 100 according to the present example embodiment includes a communication device 1 and a communication device 2 connected to each other in the form of wireless communication. The communication device 1 and the communication device 2 are connected for communication using a plurality of different frequencies. Specifically, the communication device 1 and the communication device 2 can be connected for communication through a wireless communication section therebetween by each frequency of a first frequency 3a, a second frequency 3b, and a third frequency 3c. The communication device 1 and the communication device 2 switch the frequency to be used in a wireless communication section 3 according to the communication state. That is to say, the communication device 1 and the communication device 2 decide which frequency to use to communicate with each other, among the first frequency 3a, the second frequency 3b, and the third frequency 3c, and use the decided frequency to perform wireless communication. The communication device 1 and the communication device 2 each include an antenna for each of the frequencies that are available for use.

Figure 2:
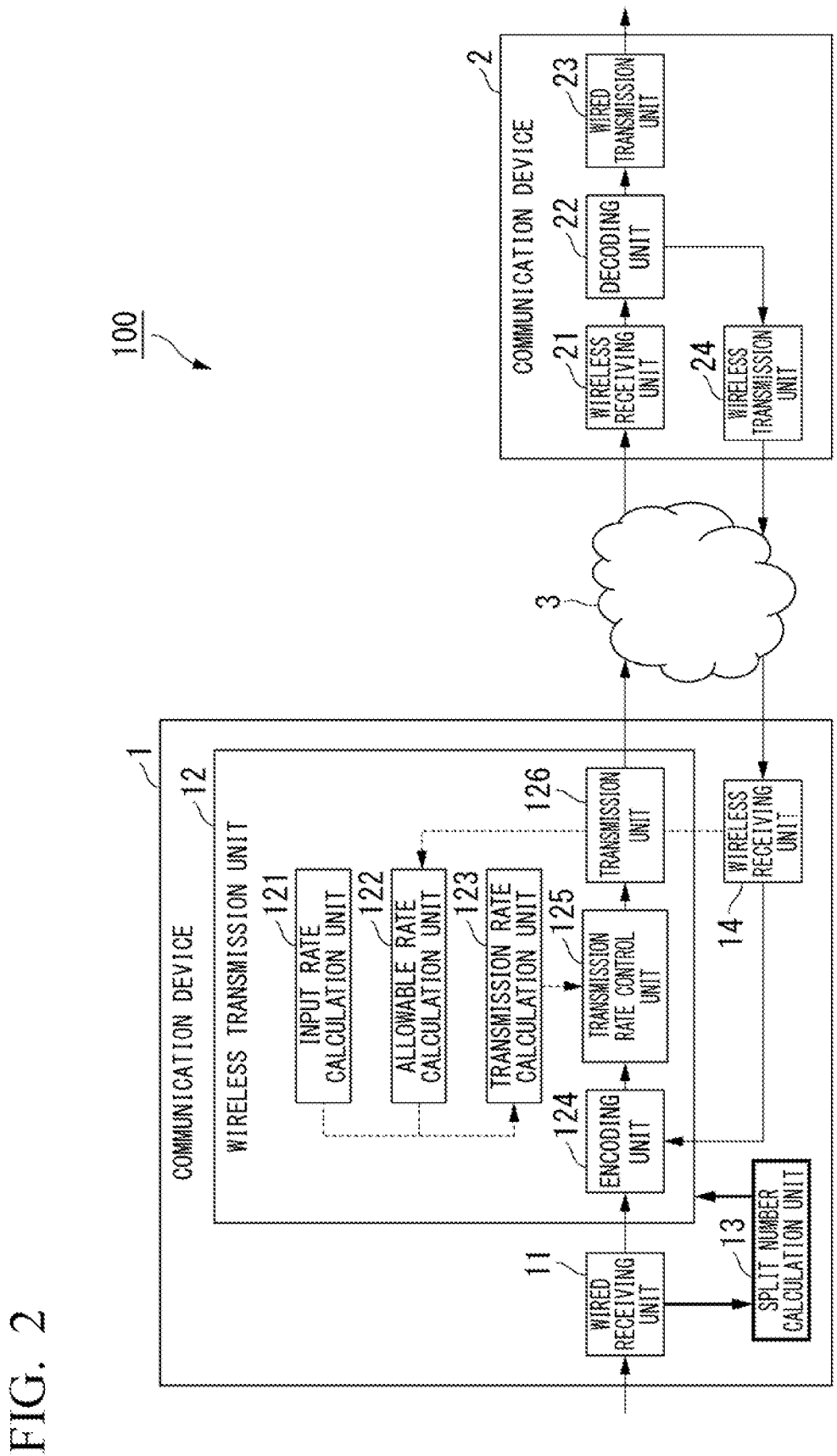
FIG. 2 is a functional block diagram of communication devices that constitute the wireless communication system according to the present example embodiment.

FIG. 2 is a functional block diagram of the communication devices that constitute the wireless communication system.

The communication device 1, which is described using the wireless communication system 100 of FIG. 2, will be mainly described as a device that transmits transmission data. The communication device 2, which is also described using the wireless communication system 100 of FIG. 2, will be mainly described as a device that receives transmission data transmitted by the communication device 1. As shown in FIG. 2, the communication device 1 exhibits functions of a wired receiving unit 11, a wireless transmission unit 12, a split number calculation unit 13, and a wireless receiving unit 14.

The wired receiving unit 11 receives transmission data addressed to the communication device 2 from another device to which the communication device 1 connects via a wired network.

The wireless transmission unit 12 performs control so that the received transmission data addressed to the communication device 2 is wirelessly transmitted to the communication device 2.

The split number calculation unit 13 splits the transmission data, based on a setting value.

The wireless receiving unit 14 receives the data wirelessly transmitted from the communication device 2.

The wireless transmission unit 12 of the communication device 1 exhibits functions of an input rate calculation unit 121, an allowable rate calculation unit 122, a transmission rate calculation unit 123, an encoding unit 124, a transmission rate control unit 125, and a transmission unit 126.

The input rate calculation unit 121 calculates the amount of data received by the wired receiving unit 11 per unit time (input rate).

The allowable rate calculation unit 122 calculates the maximum allowable amount of transmission data per unit time (allowable rate) through the wireless communication with the communication device 2.

The transmission rate calculation unit 123 specifies the amount of data per unit time (transmission rate) that indicates the smaller value between the input rate and the allowable rate.

The encoding unit 124 splits and encodes the transmission data, based on the setting value of the split number.

The transmission rate control unit 125 instructs to transmit transmission data, based on the transmission rate calculated by transmission rate calculation unit 123.

The transmission unit 126 transmits the transmission data to the communication device 2, based on the instruction of the transmission rate control unit 125. The transmission unit 126 switches the frequency of transmitting the transmission data through the wireless communication section.

The communication device 2 exhibits functions of a wireless receiving unit 21, a decoding unit 22, a wired transmission unit 23, and a wireless transmission unit 24.

The wireless receiving unit 21 receives the transmission data transmitted from the communication device 1.

The decoding unit 22 decodes the transmission data. The wired transmission unit 23 transmits the data decoded by the decoding unit 22 to the wired network side.

The wireless transmission unit 24 transmits response data, such as ACK when transmission data is received, to the communication device 1.

The communication device 1 and the communication device 2 can each serve on the transmission side or on the reception side of transmission data. That is to say, the communication device 1 exhibits the function of the communication device 2 when receiving data through wireless communication, and the communication device 2 exhibits the function of the communication device 1 when transmitting data through wireless communication. Hereunder, the communication device 1 will be described as being on the transmission side and the communication device 2 will be described as being on the reception side.

Figures 3, 4:
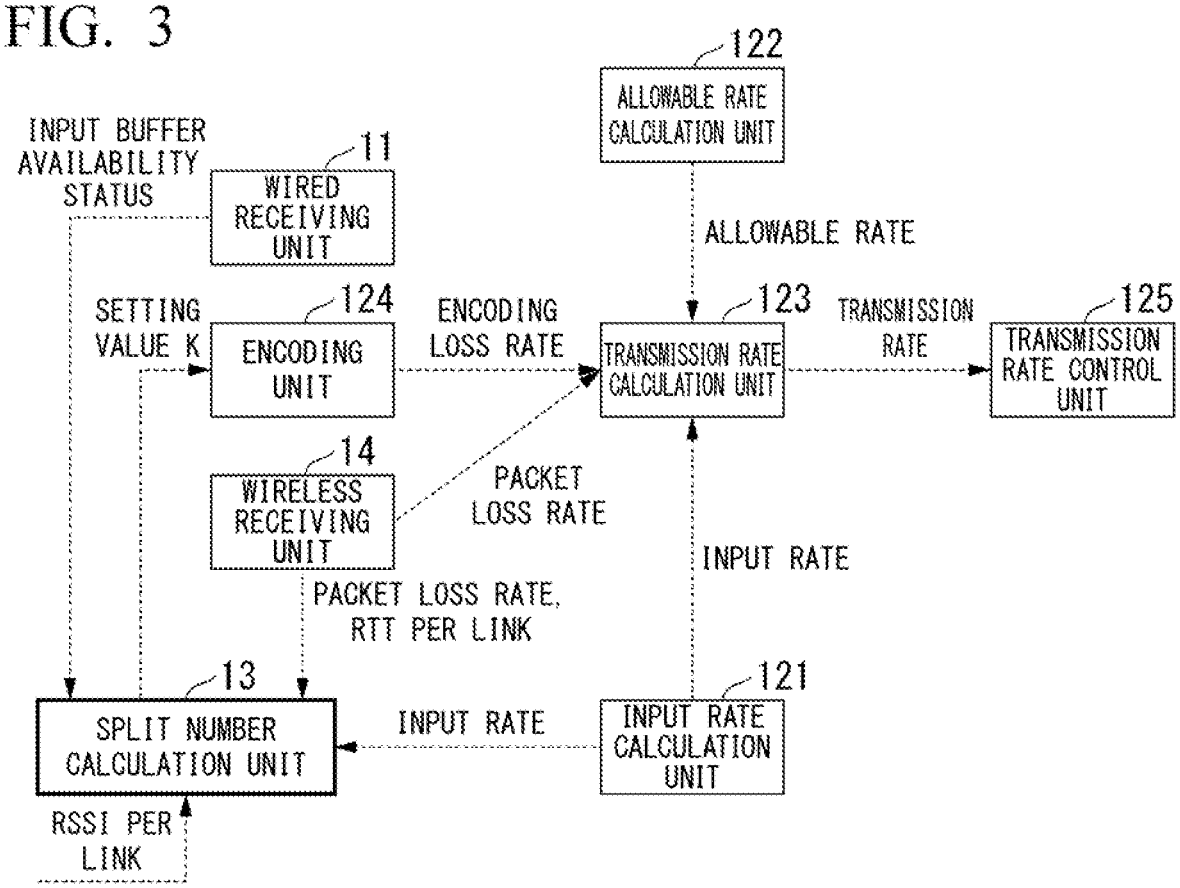
FIG. 3 is a diagram schematically showing processing of the communication device on a transmission side, according to the present example embodiment.
FIG. 4 is a diagram showing an example of matrix data according to the present example embodiment.

FIG. 3 is a diagram schematically showing processing of the communication device on the transmission side.

FIG. 4 is a diagram showing an example of matrix data used for calculating a split number setting value.

The split number calculation unit 13 described above acquires from the wired receiving unit 11 the data amount in the available buffer in the input buffer (hereinafter, referred to as available buffer size) as input buffer availability information. The split number calculation unit 13 also acquires from the wireless receiving unit 14 the packet loss rate and the RTT (Round-Trip Time) for each link of each frequency detected by the communication device 1 in the wireless communication with the communication device 2. The split number calculation unit 13 also acquires from the input rate calculation unit 121 the input rate (the amount of data received by the wired receiving unit 11 per unit time). The split number calculation unit 13 acquires the RSSI (Received Signal Strength Indicator) value for each link of each frequency detected by the communication device 1 in the wireless communication with the communication device 2. The split number calculation unit 13 calculates a setting value K for the split number of the transmission data, based on the available buffer size, the packet loss rate, the RTT, the input rate, and the RSSI value that have been acquired. These pieces of information used for calculating the setting value K are an aspect of transmission parameters for the communication device 2 of the transmission destination of transmission data.

More specifically, for example, the split number calculation unit 13 may calculate a consumption rate of the input buffer based on the available buffer size and the input rate, and may use matrix data that stores the K value according to the relationship between the consumption rate and the RSSI value. The consumption rate of the input buffer may be the average accumulated amount of data in the input buffer per unit time. The split number calculation unit 13 may calculate a numerical value indicating the input state of data based on one or more of: the available buffer size; the packet loss rate; the RTT; and the input rate that have been acquired, and may calculate the split number setting value K, using the matrix data (see FIG. 4) that stores the K value according to the relationship between the numerical value and the RSSI value. Alternatively, the split number calculation unit 13 may calculate the setting value K by inputting the available buffer size, the packet loss rate, the RTT, the input rate, and the RSSI value that have been acquired, into a predetermined calculation equation. It should be noted that the RSSI value indicates a negative value, and the unit thereof is dBm. Also, the closer the RSSI value is to 0, the higher the received signal strength becomes, which enables more stable communication. The matrix data shown in FIG. 4 indicates that the lower the RSSI value, the larger the setting value K of the split number becomes. Moreover, the matrix data shown in FIG. 4 indicates that the lower the input buffer consumption rate, the larger the setting value K of the split number becomes.

The encoding unit 124 splits transmission data using the split number setting value K, and generates multiple transmission unit packets containing one of the multiple pieces of split data output as a result of the splitting, or transmission unit packets composed of an exclusive OR of multiple pieces of split data selected randomly from the multiple pieces of split data. The encoding unit 124 instructs the transmission rate control unit 125 to sequentially transmit the transmission unit packets. At this time, the transmission rate calculation unit 123 calculates the transmission rate, using the input rate acquired from the wired receiving unit 11, the encoding loss rate acquired from the encoding unit 124, the packet loss rate acquired from the wireless receiving unit 14, the input rate acquired from the input rate calculation unit 121, and the allowable rate acquired from the allowable rate calculation unit 122. Also, when calculating the transmission rate using n pieces of information, such as the input rate, the encoding loss rate, the packet loss rate, and the allowable rate, the transmission rate calculation unit 123 calculates the transmission rate, using a n-dimension matrix data that designates the transmission rate corresponding to then pieces of information. The transmission rate control unit 125 sequentially transmits transmission unit packets generated by the encoding unit 124, to the communication device 2 based on the transmission rate.

Figure 5:
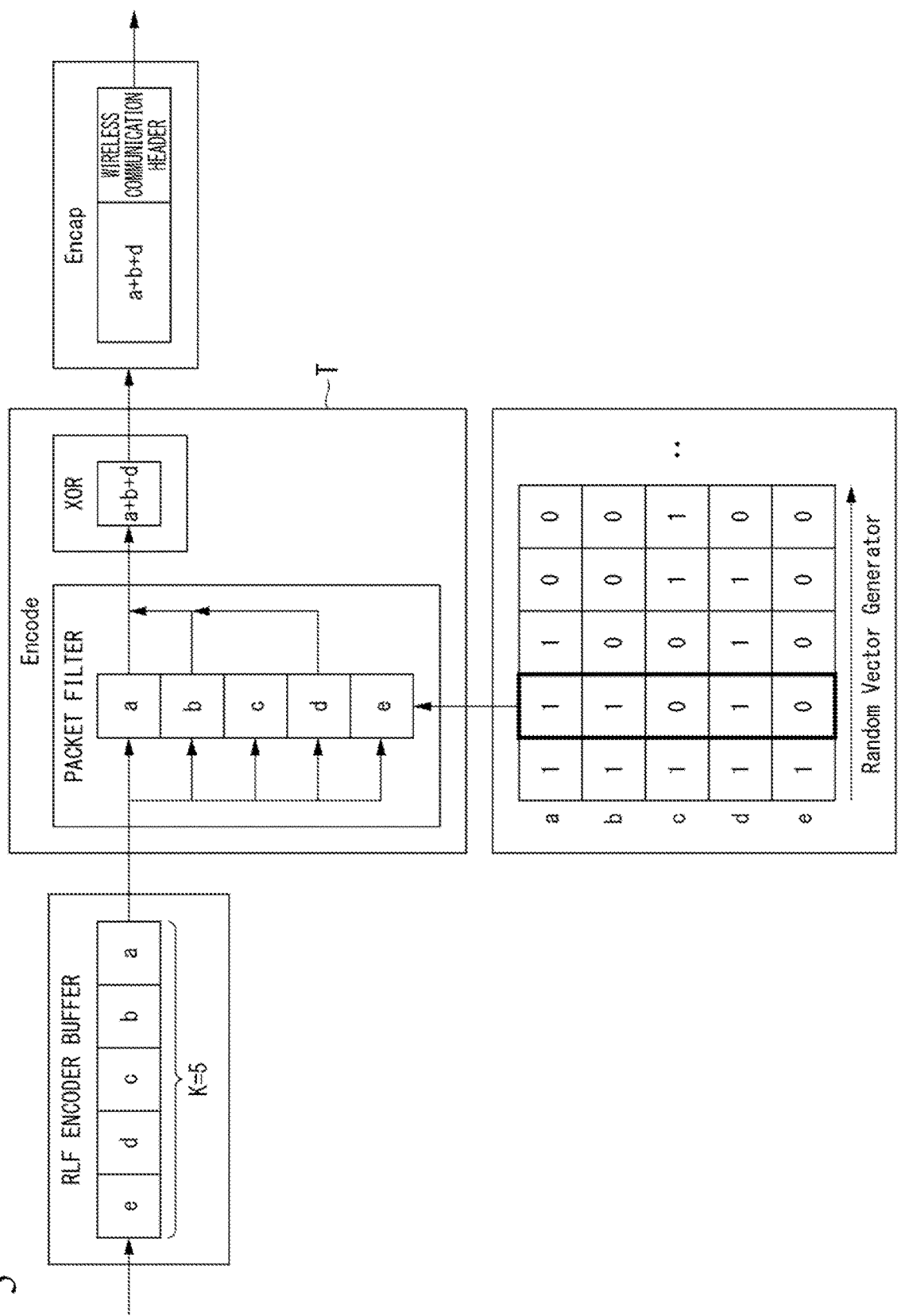
FIG. 5 is a diagram schematically showing processing of an encoding unit according to the present example embodiment.

FIG. 5 is a diagram schematically showing processing of the encoding unit.

The encoding unit 124 splits transmission data accumulated in the input buffer of the wired receiving unit 11, based on the split number setting value K. The example of FIG. 5 is an example in which transmission data is split into five pieces of split data a, b, c, d, and e where the set value K=5. The encoding unit 124 generates a random number table T for, over time, randomly selecting one or more of the multiple pieces of data a, b, c, d, and e output as a result of the splitting. Based on the random numbers recorded in the random number table T for, over time, selecting one or more multiple pieces of split data, the encoding unit 124 selects the split data pieces, and generates transmission unit packets composed of the exclusive OR of the selected split data pieces. This processing is referred to as encoding. The encoding unit 124 attaches a header or the like to the generated transmission unit packet to generate a transmission packet. The encoding unit 124 outputs the transmission packets to the transmission rate control unit 125.

Figure 6:
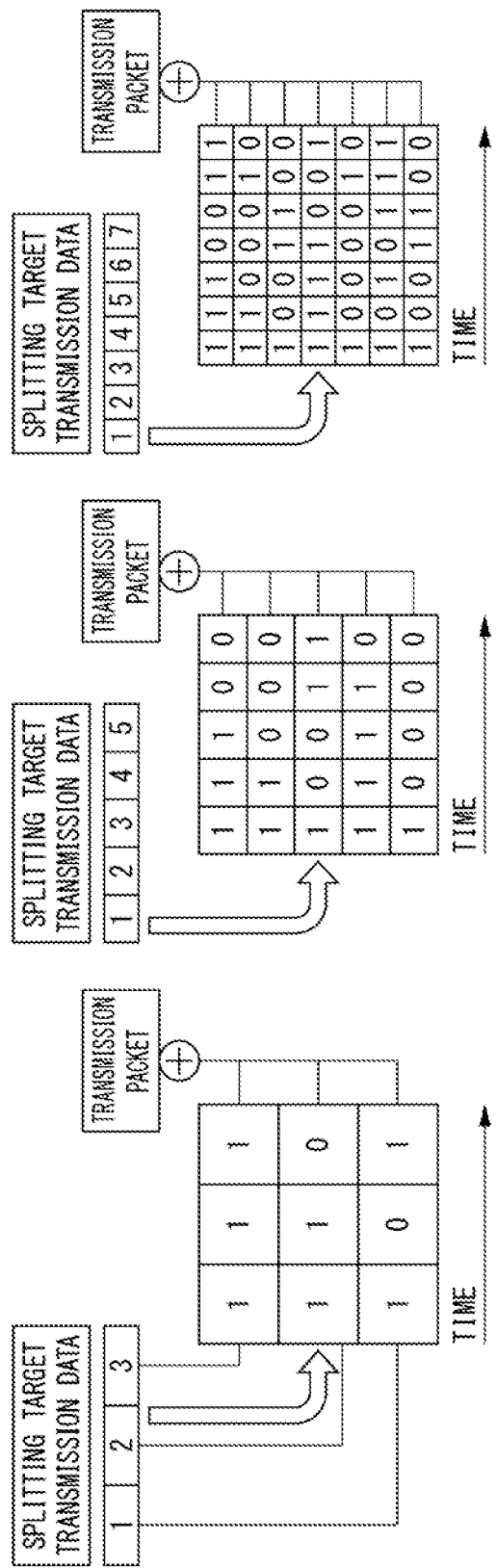
FIG. 6 is a diagram showing processing of split number calculation according to a setting value of the split number, according to the present example embodiment.

FIG. 6 is a diagram showing processing of split number calculation according to the split number setting value.

FIG. 6 schematically shows processing of the split number calculation unit 13 in those cases where the split number setting value K=3, the split number setting value K=5, and the split number setting value K=7, respectively. As shown in FIG. 6, as the split number setting value K increases, the number of transmission unit packets increases.

Figure 7:
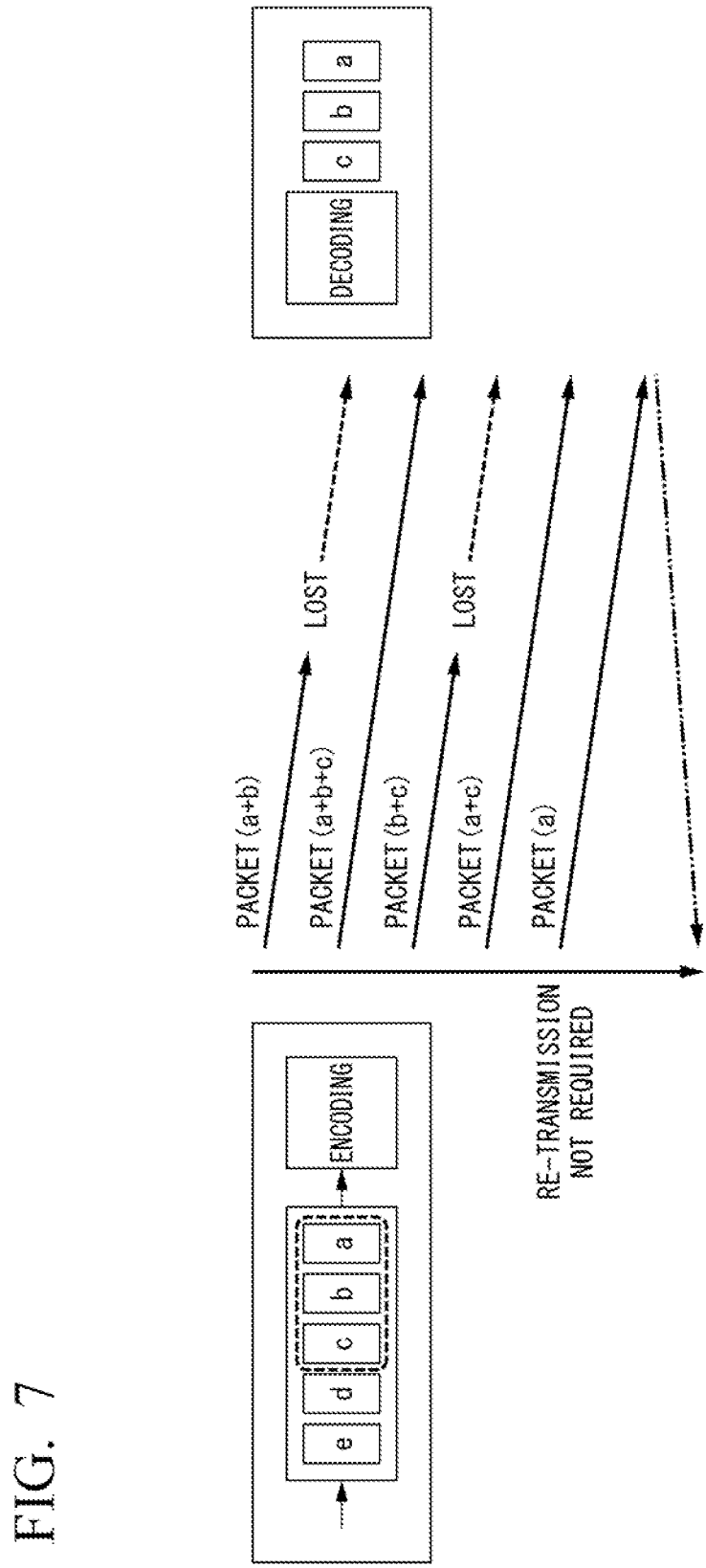
FIG. 7 is a diagram schematically showing processing of transmitting transmission packets, according to the present example embodiment.

FIG. 7 is a diagram schematically showing processing of transmitting transmission packets.

As shown in FIG. 7, it is assumed that in the communication device 1, certain data is split into three pieces, based on the split number setting value K=3. The split data pieces after having been split into three are defined as split data a, split data b, and split data c, respectively. Then, the encoded transmission unit packets are transmitted to the communication device 2 in the order of, for example, a packet (a+b), a packet (a+b+c), a packet (b+c), a packet (a+c), and a packet (a). Here, "+" indicates an exclusive OR (XOR). For example, the packet (a+b) indicates the exclusive OR of the split data a and the split data b.

In this example, the packet (a+b) and the packet (b+c) are assumed to have been lost on the way. In this case, the number of input packets which is unknown, is three, that is, the split data a, the split data b, and the split data c. The communication device 2 can find the split data a, the split data b, and the split data c based on the transmission packet (a+b+c), the transmission packet (a+c), and the transmission packet (a) containing the three received pieces of split data. In this way, by receiving the packets transmitted as a result of the encoding described above, and the same number of encoded transmission unit packets as the unknown number in the communication device 2 on the reception side, all of the split data pieces can be decoded.

Figure 8:
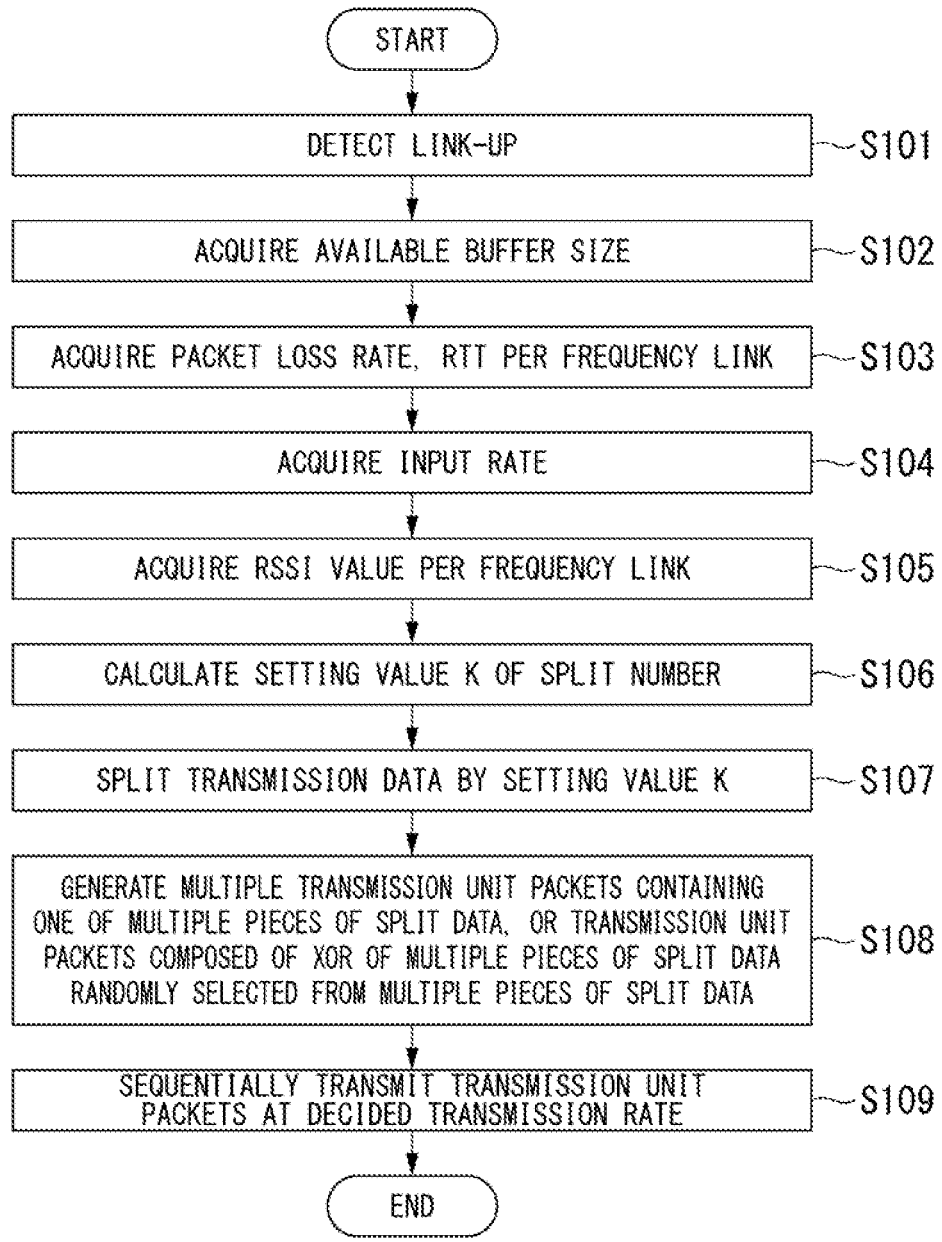
FIG. 8 is a diagram showing a processing flow of the communication device according to the present example embodiment.

FIG. 8 is a diagram showing a processing flow of the communication device. Next, the processing flow of the communication device will be described in a step-by-step manner.

The wireless transmission unit 12 of the communication device 1 detects link-up of wireless communication connection established with a communication device (Step S101). The wireless transmission unit 12 instructs the split number calculation unit 13 to calculate the split number setting value K.

The split number calculation unit 13 acquires from the wired receiving unit 11 the data amount in the available buffer in the input buffer (hereinafter, also referred to as available buffer size) as input buffer availability information (Step S102). The split number calculation unit 13 also acquires from the wireless receiving unit 14 the packet loss rate and the RTT (Round-Trip Time) for each link of each frequency detected by the communication device 1 in the wireless communication with the communication device 2 (Step S103). The split number calculation unit 13 also acquires from the input rate calculation unit 121 the input rate (the amount of data received by the wired receiving unit 11 per unit time) (Step S104). The split number calculation unit 13 acquires the RSSI (Received Signal Strength Indicator) value for each link of each frequency detected by the communication device 1 in the wireless communication with the communication device 2 (Step S105). The split number calculation unit 13 calculates a setting value K for the split number of the transmission data, based on the available buffer size, the packet loss rate, the RTT, the input rate, and the RSSI value that have been acquired (Step S106). A specific example of calculating the setting value K is the same as the processing described with reference to FIG. 3 and FIG. 4.

The split number calculation unit 13 outputs the split number setting value K to the encoding unit 124. The encoding unit 124 splits transmission data using the split number setting value K (Step S107). The encoding unit 124 generates multiple transmission unit packets containing one of the multiple pieces of split data output as a result of the splitting, or transmission unit packets composed of an exclusive OR of multiple pieces of split data selected randomly from the multiple pieces of split data (Step S108). This processing is referred to as encoding. The encoding unit 124 instructs the transmission rate control unit 125 to sequentially transmit the transmission unit packets.

The transmission rate control unit 125 acquires an input rate from the input rate calculation unit 121. The transmission rate control unit 125 acquires an allowable rate from the allowable rate calculation unit 122. The transmission rate control unit 125 selects the smaller value between the input rate and the allowable rate. The transmission rate control unit 125 decides the selected value as the transmission rate. The transmission rate control unit 125 instructs the transmission unit 126 to sequentially transmit transmission unit packets at the decided transmission rate. The transmission unit 126 selects a frequency corresponding to the transmission rate from the first frequency 3a, the second frequency 3b, and the third frequency 3c. The transmission unit 126 uses the antenna for the selected frequency to sequentially transmit the transmission unit packets at the decided transmission rate (Step S109).

It should be noted that in the processing described above, after transmission of all of the split data packets of the previously transmitted transmission data has been completed, the transmission rate control unit 125 splits the next transmission data by the split number based on the setting value K newly obtained from the split number calculation unit 13.

The transmission rate calculation unit 123 may calculate the transmission rate using: the input rate acquired from the wired receiving unit 11; the encoding loss rate acquired from the encoding unit 124; the packet loss rate acquired from the wireless receiving unit 14; the input rate acquired from the input rate calculation unit 121; and the allowable rate acquired from the allowable rate calculation unit 122.

Transmission of transmission data performed by the communication device 1 in the manner described above is a technique of sequentially transmitting split data packets generated based on the split number setting value K even if there is no response signal from the communication device 2. However, this method has a disadvantage of reducing the amount of communication data per unit time of another communication device that uses the same wireless method. Therefore, the communication device 1 may input (receive) information such as the degree of congestion for each frequency as network information, and may calculate the amount of data to be transmitted per unit time on the frequency to be used according to the degree of congestion. In this case, the transmission rate control unit 125 may control the transmission rate with such transmission data amount per unit time serving as an upper limit, to thereby ensure the quality of communication while maintaining the balance of the communication data amount per unit time with respect to another communication device that performs communication using the same frequency band.

The wireless receiving unit 21 of the communication device 2 sequentially receives the packets transmitted from the communication device 1. The decoding unit 22 decodes the split data, using the received packets. The decoding unit 22 outputs the decoded split data to the wired transmission unit 23. The wired transmission unit 23 reconfigures transmission data that integrates the split data, and transmits it to the connection destination of the communication connection in a wired manner. The wireless transmission unit 24 of the communication device 2 transmits a response signal to the communication device 1 in response to each received packet. The wireless receiving unit 14 of the communication device 1 receives the response signal and outputs the RTT calculated based on the response signal, to the encoding unit 124 and to the split number calculation unit 13.

According to the processing described above, the communication device 1 splits and transmits transmission data based on the split number setting value K for the transmission data calculated based on transmission parameters for the transmission destination communication device of the transmission data. The transmission parameters are parameters according to the degree of the favorable communication state for the transmission destination communication device of transmission data of the communication device 1. Then, for example, the lower the consumption rate of the input buffer is among the transmission parameters, or the lower the RSSI value is, the larger the split number setting value K becomes. Therefore, the worse the communication state, the greater the number of split pieces of transmission data. As a result, the worse the communication state becomes, the communication device 1 increases the split number to reduce the amount of data to be transmitted at once, thereby creating an environment in which packets are likely to reach the communication destination. On the other hand, the more favorable the communication state becomes, the fewer the communication device 1 can reduce the split number to, thereby increasing the amount of data to be transmitted at once. According to such processing described above, it is possible to perform communication with a more appropriate amount of data per unit time, according to the state of wireless communication performed between the communication device 1 and the communication device 2.

In the processing described above, the split number calculation unit 13 may determine whether or not the communication state is bad based on the RSSI value or the available buffer size, which are some of the transmission parameters, and may determine to calculate the split number setting value K according to the result of determining whether or not the communication state is bad, based on the transmission parameters. For example, the split number calculation unit 13 inputs the transmission parameters into a determination equation for determining the communication state, compares the numerical value of the obtained result against a threshold value, and determines whether or not the communication state is bad, based on the magnitude relationship therebetween. Alternatively, the split number calculation unit 13 may determine whether or not the communication state is bad, based simply on the magnitude relationship between the value of a transmission parameter, such as RSSI value and available buffer size, and the threshold value thereof. If the communication state is determined as bad, the split number calculation unit 13 sets the split number setting value K to a greater value. If the communication state is determined as good, the split number calculation unit 13 sets the split number setting value K to a smaller value. At this time, the split number calculation unit 13 may calculate the setting value K according to the value of a transmission parameter or the value calculated using a communication state determination equation, or may use the matrix data described above to calculate the setting value K in a similar manner. Alternatively, the setting value K may be calculated by inputting the value of a transmission parameter or the value calculated using a communication state determination equation, into a predetermined setting value K calculation equation.

Figure 9:
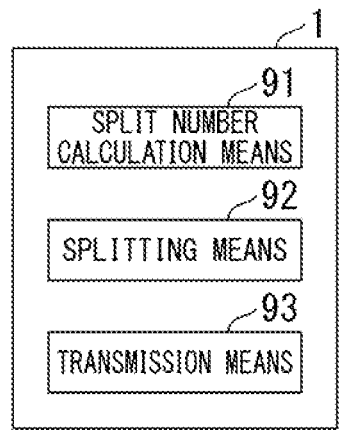
FIG. 9 is a diagram showing an example of a configuration of the communication device according to the present example embodiment.

FIG. 9 is a diagram showing an example of a configuration of the communication device.

Figure 10:
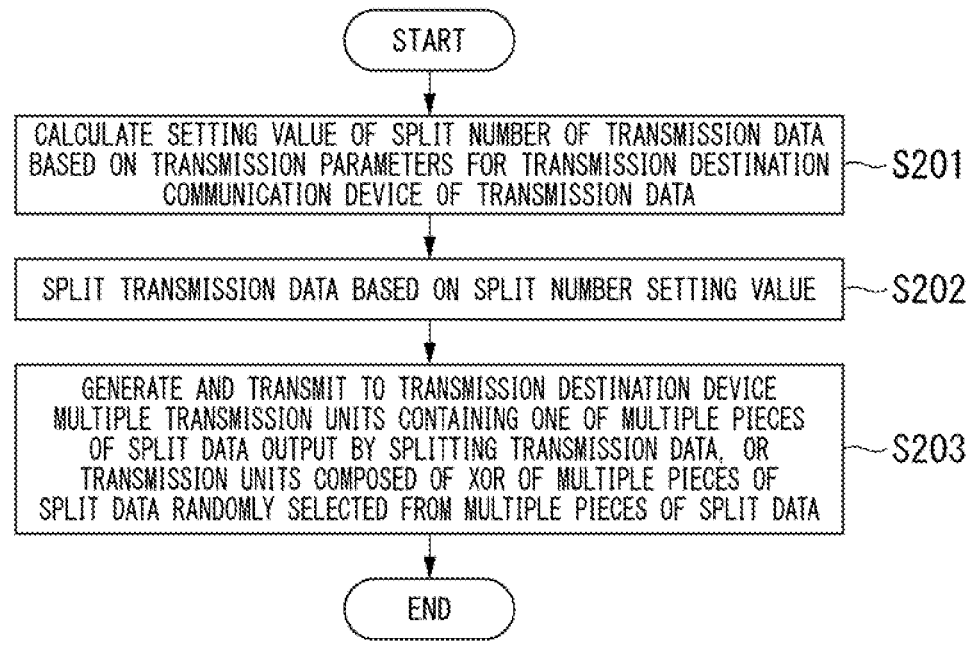
FIG. 10 is a diagram showing a processing flow of the communication device of FIG. 9.

FIG. 10 is a diagram showing a processing flow of the communication device of FIG. 9.

The communication device 1 exhibits at least functions of a split number calculation means 91, a splitting means 92, and a transmission means 93.

The split number calculation means 91 calculates a setting value of a split number of transmission data, based on transmission parameters for the transmission destination communication device 2 of the transmission data (Step S201).

The splitting means 92 splits transmission data, based on the setting value of the split number (Step S202).

The transmission means 93 generates and transmits to a transmission destination communication device, multiple transmission units containing one of multiple pieces of split data output by splitting transmission data, or transmission units composed of an exclusive OR of multiple pieces of split data selected randomly from the multiple pieces of split data (Step S203).

Figure 11:
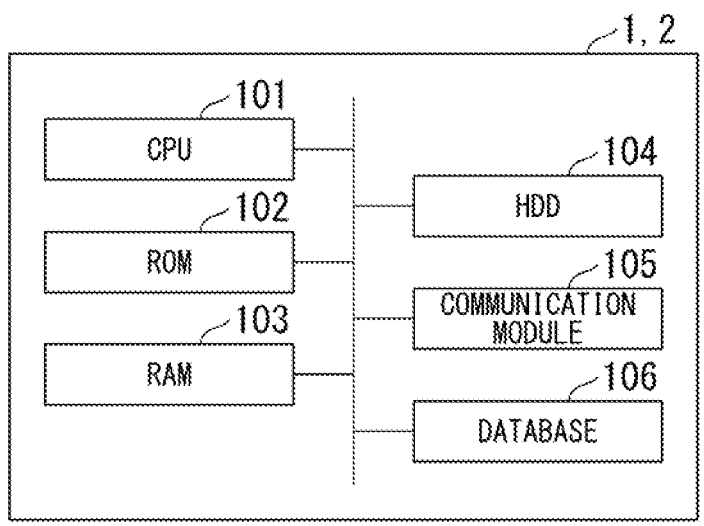
FIG. 11 is a diagram showing a hardware configuration of the communication device according to the present example embodiment.

FIG. 11 is a diagram showing a hardware configuration of the communication device.

A computer of the communication device 1 or the communication device 2 includes, as shown in FIG. 11, hardware components such as a CPU (Central Processing Unit) 101, a ROM (Read Only Memory) 102, a RAM (Random Access Memory) 103, an HDD 104, a communication module 105, and a database 106.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication device comprising:
    a memory configured to store instructions; and
    a processor configured to execute the instructions to:
        calculate a setting value of a split number of transmission data, based on a transmission parameter between the communication device and a transmission destination communication device to which the transmission data is to be transmitted;
        split the transmission data based on the setting value of the split number to obtain a plurality of pieces of split data;
        generating a plurality of transmission units, the plurality of transmission units comprising: a transmission unit that comprises one of the plurality of transmission units; and a transmission unit composed of an exclusive OR of a plurality of pieces of split data that are selected randomly from the plurality of pieces of split data; and
        transmitting the plurality of transmission units to the transmission destination communication device.

2. The communication device according to claim 1, wherein the processor is configured to execute the instructions to: calculate the setting value of the split number, based on the transmission parameter indicating a communication state between the communication device and the transmission destination communication device.

3. The communication device according to claim 2, wherein the processor is configured to execute the instructions to: determine whether or not the communication state is bad based on the transmission parameter, and calculate a new setting value of the split number according to a result of the determination.

4. The communication device according to claim 1, wherein the processor is configured to execute the instructions to: split next transmission data using a new setting value of the splitting device after transmission of the transmission data is completed.

5. A communication method for a communication device, comprising:
    calculating a setting value of a split number of transmission data, based on a transmission parameter between the communication device and a transmission destination communication device to which the transmission data is to be transmitted;
    splitting the transmission data based on the setting value of the split number to obtain a plurality of pieces of split data;
    generating a plurality of transmission units, the plurality of transmission units comprising: a transmission unit that comprises one of the plurality of transmission units;
    and a transmission unit composed of an exclusive OR of a plurality of pieces of split data that are selected randomly from the plurality of pieces of split data; and
    transmitting the plurality of transmission units to the transmission destination communication device.

6. A non-transitory computer-readable recording medium that stores a program for causing a computer of a communication device to execute:
    calculating a setting value of a split number of transmission data, based on a transmission parameter between the communication device and a transmission destination communication device to which the transmission data is to be transmitted;
    splitting the transmission data based on the setting value of the split number to obtain a plurality of pieces of split data;
    generating a plurality of transmission units, the plurality of transmission units comprising: a transmission unit that comprises one of the plurality of transmission units;
    and a transmission unit composed of an exclusive OR of a plurality of pieces of split data that are selected randomly from the plurality of pieces of split data; and
    transmitting the plurality of transmission units to the transmission destination communication device.

* * * * *